(12) United States Patent
Theodos et al.

(10) Patent No.: US 8,558,142 B2
(45) Date of Patent: Oct. 15, 2013

(54) HIGH DENSITY UNIVERSAL HOLDING CABINET

(75) Inventors: Michael Andrew Theodos, Bossier City, LA (US); Joshua Michael Cox, Shreveport, LA (US); Marie Antoinette Ketterman, Blanchard, LA (US)

(73) Assignee: Restaurant Technology, Inc., Oak Brook, IL (US)

( * ) Notice: Subject to any disclaimer, the term of this patent is extended or adjusted under 35 U.S.C. 154(b) by 214 days.

(21) Appl. No.: 12/761,820

(22) Filed: Apr. 16, 2010

(65) Prior Publication Data

US 2011/0253698 A1 Oct. 20, 2011

(51) Int. Cl.
| | |
|---|---|
| F27D 11/00 | (2006.01) |
| B21D 39/03 | (2006.01) |
| B23P 11/00 | (2006.01) |
| F24H 3/02 | (2006.01) |

(52) U.S. Cl.
USPC .............................. 219/385; 29/428; 165/121

(58) Field of Classification Search
USPC .............................. 219/385; 29/428; 165/121
See application file for complete search history.

(56) References Cited

U.S. PATENT DOCUMENTS

| | | | |
|---|---|---|---|
| 4,446,780 A | 5/1984 | Puvogel et al. ................. 99/480 |
| 4,446,811 A | 5/1984 | Howie, Jr. ...................... 116/309 |
| 4,605,840 A | 8/1986 | Koopman ...................... 219/401 |
| D335,732 S | 5/1993 | King ................................ D34/21 |
| 5,771,959 A | 6/1998 | Westbrooks, Jr. et al. ... 165/48.1 |
| 5,783,803 A | 7/1998 | Robards, Jr. ................... 219/392 |
| 5,880,434 A | 3/1999 | Pinnow et al. ................. 219/386 |
| 5,900,173 A | 5/1999 | Robards, Jr. ................... 219/392 |
| 6,011,243 A | 1/2000 | Arnold et al. ................. 219/506 |
| 6,658,994 B1 | 12/2003 | McMillan ....................... 99/468 |
| 7,105,779 B2 | 9/2006 | Shei ................................ 219/413 |
| 7,132,926 B2 | 11/2006 | Vaseloff et al. .............. 340/5.92 |
| 7,258,064 B2 | 8/2007 | Vaseloff et al. ................. 99/468 |
| 7,446,282 B2 | 11/2008 | Shei et al. ...................... 219/391 |
| 7,628,107 B2 | 12/2009 | Vaseloff et al. ................. 99/468 |
| 2004/0020915 A1 | 2/2004 | Shei ................................ 219/385 |
| 2004/0069155 A1 | 4/2004 | Shei ................................ 99/448 |
| 2004/0139863 A1 | 7/2004 | Boryca et al. ................. 219/385 |
| 2005/0211775 A1 | 9/2005 | Vaseloff et al. ............... 235/385 |
| 2005/0255208 A1 | 11/2005 | Shei ................................ 426/523 |
| 2006/0185527 A1 | 8/2006 | Shei ................................ 99/468 |
| 2007/0144202 A1 | 6/2007 | Theodos et al. ................. 62/348 |
| 2008/0023462 A1 | 1/2008 | Shei et al. ...................... 219/394 |
| 2008/0213449 A1 | 9/2008 | Wisner et al. ................... 99/374 |
| 2009/0064874 A1 | 3/2009 | Chew ............................... 99/473 |
| 2011/0253703 A1 * | 10/2011 | Theodos et al. .............. 219/492 |

OTHER PUBLICATIONS

International Search Report and Written Opinion mailed May 31, 2011 in corresponding PCT/US2011/029488.
International Search Report and Written Opinion mailed Jun. 3, 2011 in related PCT/US2011/029487.
International Preliminary Report on Patentability Mailed May 11, 2012 in the Corresponding PCT/US11/029488.

* cited by examiner

Primary Examiner — David S Blum
(74) Attorney, Agent, or Firm — Ryndak & Suri LLP

(57) ABSTRACT

A universal food holding cabinet for keeping precooked food warm. The food holding cabinet includes a plurality of row assemblies that each includes first and second spaced apart heater plates to form a food holding cavity. A bezel extends across an edge of the upper heating plate of a row assembly and an edge of the lower heating plate of an adjacent row assembly. The bezel includes an air duct for cooling components associated with displays carried by the bezel. The bezel is fastened to the upper heater plate and the lower heating plate with an interlock that helps to mitigate oil migration among the row assemblies.

26 Claims, 10 Drawing Sheets

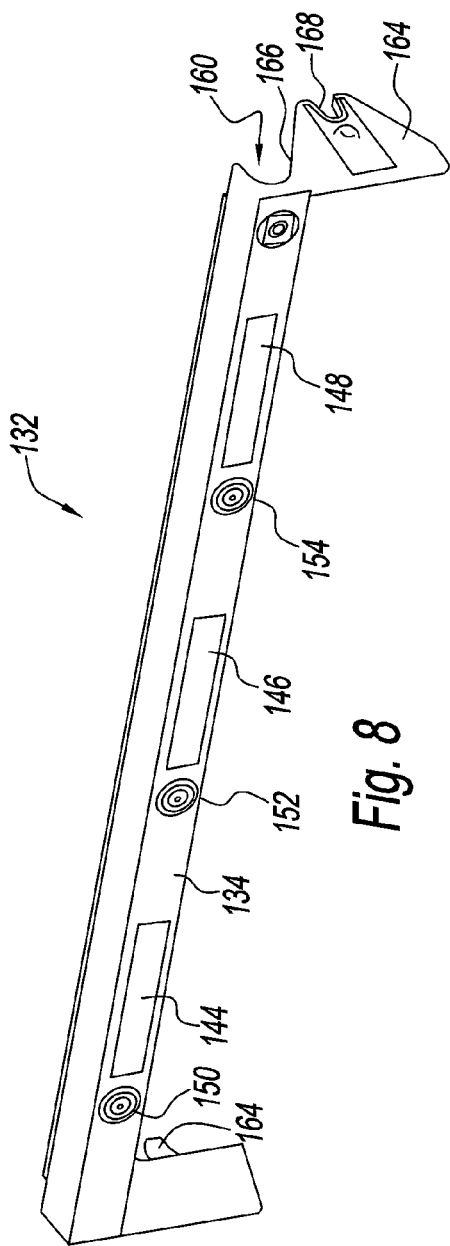
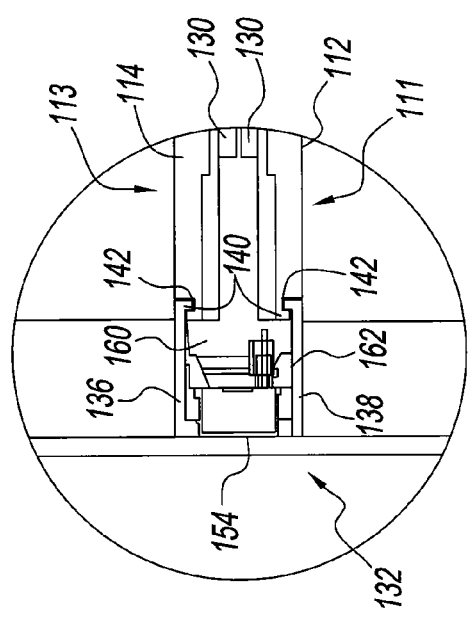

HIGH DENSITY UNIVERSAL HOLDING CABINET

RELATED APPLICATION

This application is related to U.S. patent application Ser. No. 12/761,919 of Michael Andrew Theodos, Steven Matthew Takata, and Charles D. Grant, which is assigned to the assignee of this application and is filed on the same date as this application.

FIELD OF THE DISCLOSURE

This disclosure relates to a food holding cabinet that has a high density of food warming cavities with no appreciable increase in cabinet size.

BACKGROUND OF THE DISCLOSURE

Food holding cabinets are used to maintain optimal cooked food product temperatures until served. Individual trays are loaded into shelf like assemblies within the cabinet with heating plates. Cooks within a restaurant typically cook food in small batches likely beyond the immediate need of the product. This excess food is placed in a tray within a holding cabinet shelf that is used to maintain the temperature of that food product until served.

Known food holding cabinets provide a limited number of shelves within a given volume or footprint. There is a demand for more shelves, which has been satisfied with additional food holding cabinets that take up additional space in the kitchen or food preparation area of the restaurant.

Known food holding cabinets generally have inner panel sides that require assembly of multiple panel portions. For example, one known cabinet requires assembly of three pieces per side panel. This results in a need to purchase costly multiple panel portions and requires considerable assembly time.

Known food holding cabinets have been plagued by oil and/or grease migration into areas that affect heater elements, circuit boards, display components and buttons.

Thus, there is a need for a food holding cabinet that provides improvements that address the aforementioned disadvantages of known food holding cabinets.

SUMMARY OF THE DISCLOSURE

A food holding cabinet of the present disclosure for keeping pre-cooked food warm comprises a support structure that supports a plurality of row assemblies. Each of the row assemblies comprises a first heater assembly spaced from a second heater assembly to form a food holding cavity. A bezel covers an edge of the first heater assembly of a first one of the row assemblies and the second heater assembly of a second one of the row assemblies.

In another embodiment of the food holding cabinet of the present disclosure, each of the row assemblies further comprises a layer of insulation that surrounds the first and second heater assemblies, thereby inhibiting heat transfer between the first and second heater assemblies of adjacent ones of the row assemblies.

In another embodiment of the food holding cabinet of the present disclosure, the bezel is a first bezel. A second bezel covers an edge of the first heater assembly of the second row assembly and the second heater assembly of a third one of the row assemblies.

In another embodiment of the food holding cabinet of the present disclosure, the bezel is formed with a material selected from the group consisting of: plastic, metal and a combination thereof.

In another embodiment of the food holding cabinet of the present disclosure, the bezel is formed of plastic, and further comprises one or more buttons that are heat staked in the bezel so that loading from manual operation of the buttons is distributed along the bezel.

In another embodiment of the food holding cabinet of the present disclosure, the bezel is connected by an interlock to the first heater assembly of the first row assembly and the second heater assembly of the second row assembly. The interlock provides a seal that mitigates oil migration.

In another embodiment of the food holding cabinet of the present disclosure, each of the first and second heater assemblies comprises a heater disposed on a heater plate. The bezel is fastened by the interlock to an edge of the first heater plate of the first heater assembly of a first one of the row assemblies and to an edge of the second heater plate of the second heater assembly of a second one of the row assemblies.

In another embodiment of the food holding cabinet of the present disclosure, the interlock comprises first and second portions of the bezel that mate with a corresponding first portion of the first heater plate of the first heater assembly of the first row assembly and to a corresponding first portion of the second heater plate of the second heater assembly of the second row assembly, respectively.

In another embodiment of the food holding cabinet of the present disclosure, a cooling system comprises a plurality of fans that draw in air via at least one entry port and a duct system that guides the air in a path that includes each of the row assemblies and at least one exit port. The duct system further guides the air from first and second ones of the row assemblies to first and second ones of the first fans, respectively.

In another embodiment of the food holding cabinet of the present disclosure, the bezel is a first bezel. A second bezel is provided and covers an edge of the first heater assembly of the second row assembly and the second heater assembly of a third one of the row assemblies. Separate channels are disposed behind the first and second bezels through which the air flows to cool at least one component disposed in the channels.

In another embodiment of the food holding cabinet of the present disclosure, the duct system comprises a first duct and a second duct that are in fluid communication with the first and second row assemblies, respectively, for flow of air drawn by the first and second fans, respectively.

In another embodiment of the food holding cabinet of the present disclosure, the duct system is structured for the second fan to draw air from the first row assembly in the event of failure of the first fan.

In another embodiment of the food holding cabinet of the present disclosure, at least the first duct comprises an opening through which the second fan draws air from the first row assembly in the event of failure of the first fan.

In another embodiment of the food holding cabinet of the present disclosure, a third one of the fans that also draws air from the first row assembly, and wherein the first and third fans are in fluid communication with opposite edges of the first row assembly, respectively.

In another embodiment of the food holding cabinet of the present disclosure, the support structure comprises first and second unitary side panels that support the row assemblies.

In another embodiment of the food holding cabinet of the present disclosure, the first unitary side panel carries a duct structure that guides cooling air to a plurality of fans.

In another embodiment of the food holding cabinet of the present disclosure, the duct structure comprises one or more baffles that provide separate paths for airflow from different ones of the row assemblies or from opposite edges of one of the row assemblies drawn by the plurality of fans.

A method of the present disclosure assembles a food holding cabinet and comprises steps of:

assembling a plurality of row assemblies, wherein each of the row assemblies comprises a first heater assembly spaced from a second heater assembly to form a food holding cavity;

fastening first and second unitary side panels to opposite edge portions of a base; and fastening the plurality of row assemblies to the first and second unitary side panels.

In another embodiment of the assembling method of the present disclosure, a further step comprises fastening a plurality of bezels to the row assemblies. At least one of the bezels covers an edge of the first heater assembly of a first one of the row assemblies and the second heater assembly of a second one of the row assemblies.

In another embodiment of the assembling method of the present disclosure, each of the bezels is attached to the edges of the first and second heater assemblies with an interlock. The interlock provides a seal that mitigates oil migration. In one aspect, the bezels are attached to the edges with the interlock by a snap in action.

In another embodiment of the assembling method of the present disclosure, a further step comprises disposing on the first unitary side panel a duct structure that guides cooling air to a plurality of fans.

In another embodiment of the assembling method of the present disclosure, the duct structure comprises one or more baffles that provide separate paths for airflow from different ones of the row assemblies or from opposite edges of one of the row assemblies drawn by the plurality of fans.

Another method of the present disclosure that cools components of a food holding cabinet comprises:

drawing cooling air with a plurality of fans through a plurality of row assemblies of the food holding cabinet, wherein each of the row assemblies comprises at least one of the components, which is exposed to the cooling air; and guiding the cooling air between the row assemblies and the fans via a plurality of separate paths.

In another embodiment of the cooling method of the present disclosure, a further step comprises providing one or more baffles to form the separate paths.

In another embodiment of the cooling method of the present disclosure, a first fan and a second fan of the plurality of fans draws the cooling air from at least a first one and a second one of the row assemblies via first and second ones of the separate paths, respectively. One of the baffles has an opening through which the first fan draws air from the second row assembly should the second fan fail.

The food holding cabinet of the present disclosure holds food for extended periods until it is ready to be served while keeping its quality high. The food holding cabinet has intelligence capability to keep up with which trays were put in first so that they would be used first. This is otherwise known as First-In-First-Out (FIFO). The food holding cabinet miniaturizes the row displays and circuit boards, thereby minimizing heat loss to improve efficiency, increasing holding capacity by 50% while keeping the footprint the same size.

BRIEF DESCRIPTION OF THE DRAWINGS

Other and further objects, advantages and features of the present invention will be understood by reference to the following specification in conjunction with the accompanying drawings, in which like reference characters denote like elements of structure and:

FIG. 7 is a cross-sectional view taken along line 7 of FIG. 3;

FIG. 8 is a front perspective view of a bezel of the food holding cabinet of FIG. 3;

DESCRIPTION OF THE PREFERRED EMBODIMENT

Figure 1:
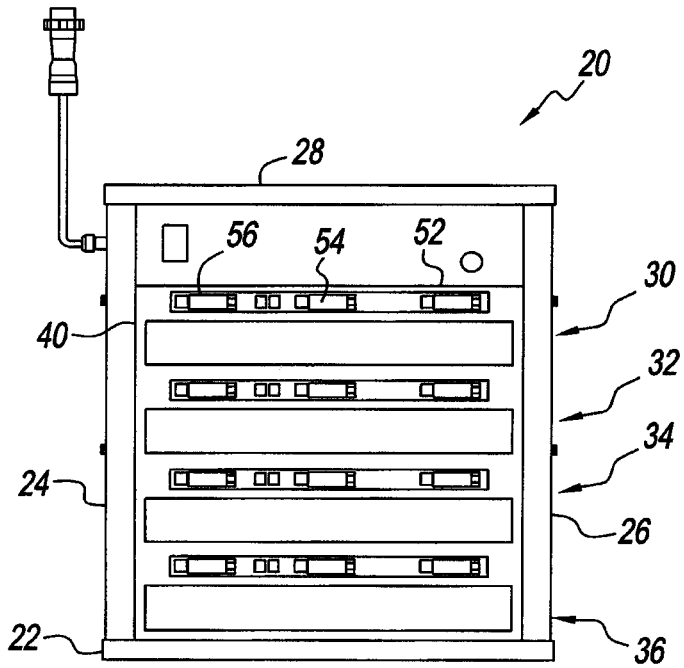
FIG. 1 is a front view of a known food holding cabinet.
Figure 2:
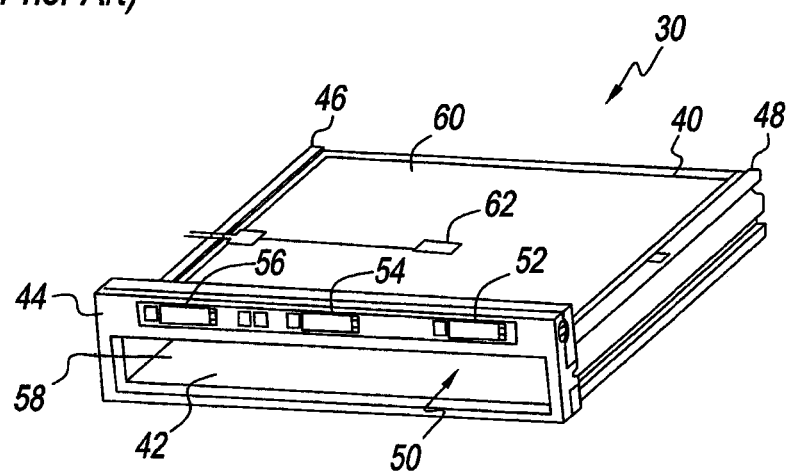
FIG. 2 is a perspective view of a row assembly of the food holding cabinet of FIG. 1.
Figure 3:
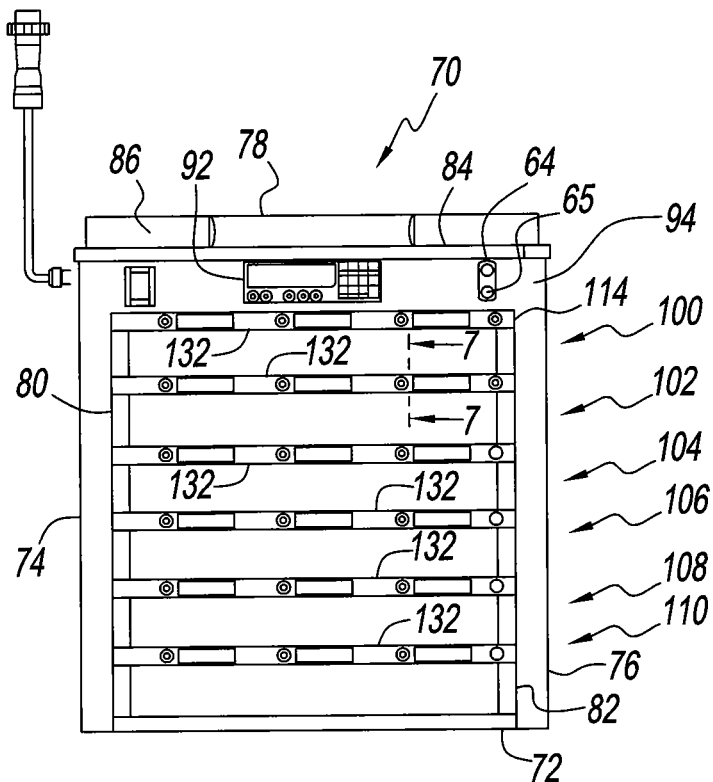
FIG. 3 is a front view of a food holding cabinet of the present disclosure.

Referring to FIGS. 1 and 2, a known food holding cabinet 20 comprises a base 22, a left side 24, a right side 26 and a top 28. A plurality of row assemblies 30, 32, 34 and 36 are supported by left side 24 and right side 26. Each row assembly, e.g., row assembly 30, comprises a heater 59, a bottom 42 and a bezel 44. Heater 59 comprises a vulcanized heater 60 disposed on a surface of a heater plate 40 and bottom 42, which are supported by a pair of side rails 46 and 48 to form a gap 50 in which a food tray may be inserted. Bezel 44 is shaped to provide display panels 52, 54 and 56 disposed along an edge of heater plate 40 and to provide an opening 58 through which food trays may be inserted. Vulcanized heater 60 carries a temperature sensor 62. The spacing between the heater plates 40 of the row assemblies is such that very little heat is transferred between adjacent rows (e.g., from row 30 to row 32). This permits heater plate 40 of each row to be independently controlled with different temperature set points for the respective food trays with negligible effect from heater plate 40 of an adjacent row.

Referring to FIGS. 3-6, a food holding cabinet 70 of the present disclosure comprises a base 72, a first outer side panel 74, a second outer side panel 76 and an outer top panel 78. A first inner side panel 80 and a second inner side panel 82 are spaced from first outer side panel 74 and second outer side panel 76 by gaps 88 and 90, respectively (shown in FIG. 4). Outer top panel 78 is spaced from an inner top panel 84 by a gap 86. A user interface 92, a time query button 64 and a temperature query button 65 are disposed on a front panel 94 (shown in FIG. 3). An electrical cord plugs into an outlet that provides alternating current (AC) power from an AC source (not shown) via an ON/OFF switch to a power module (not shown) that distributes operating power to various electrically operated components of food holding cabinet 70 that require AC power. The power module includes an AC to DC (direct current) converter (not shown) to provide DC power to those components that require DC operating power.

Figure 4:
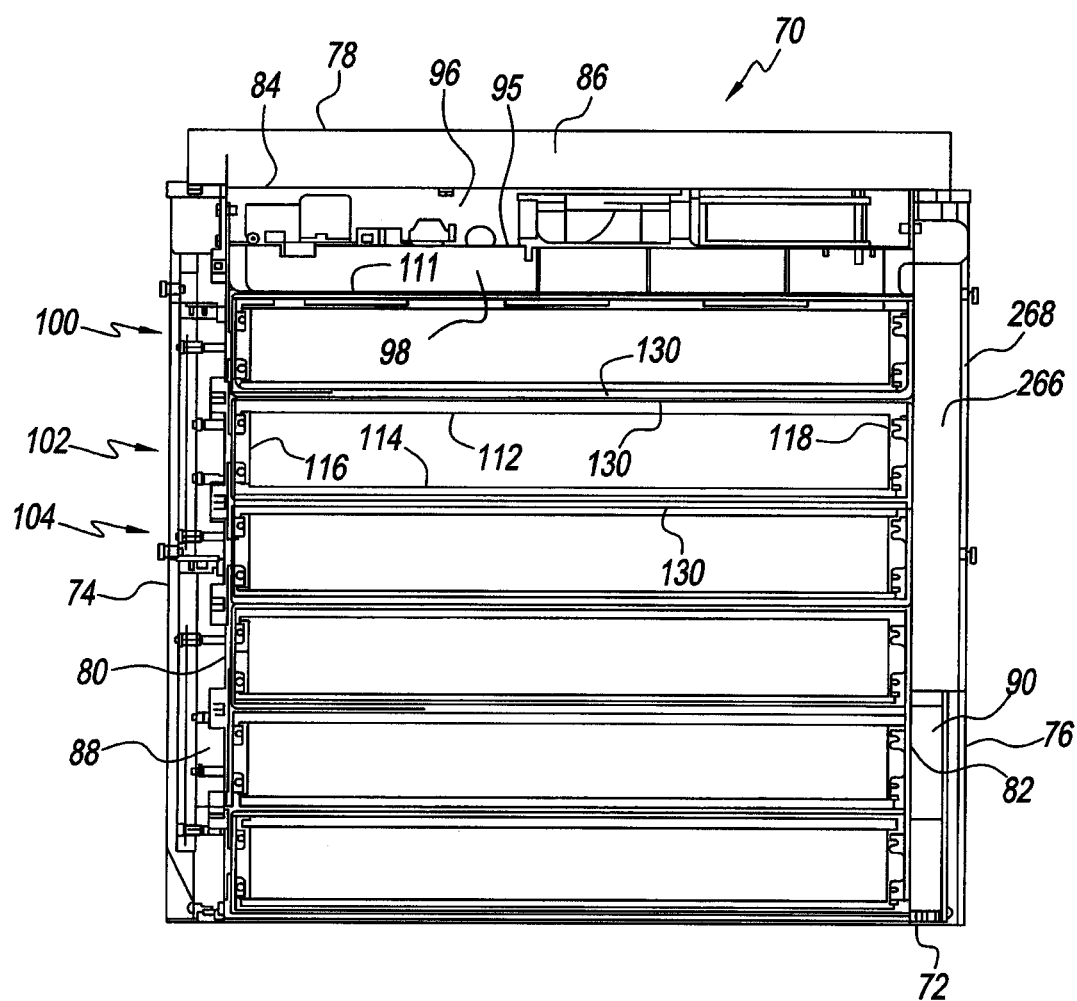
FIG. 4 is a front view of the food holding cabinet of FIG. 3 with bezels and front panel removed.
Figure 6:
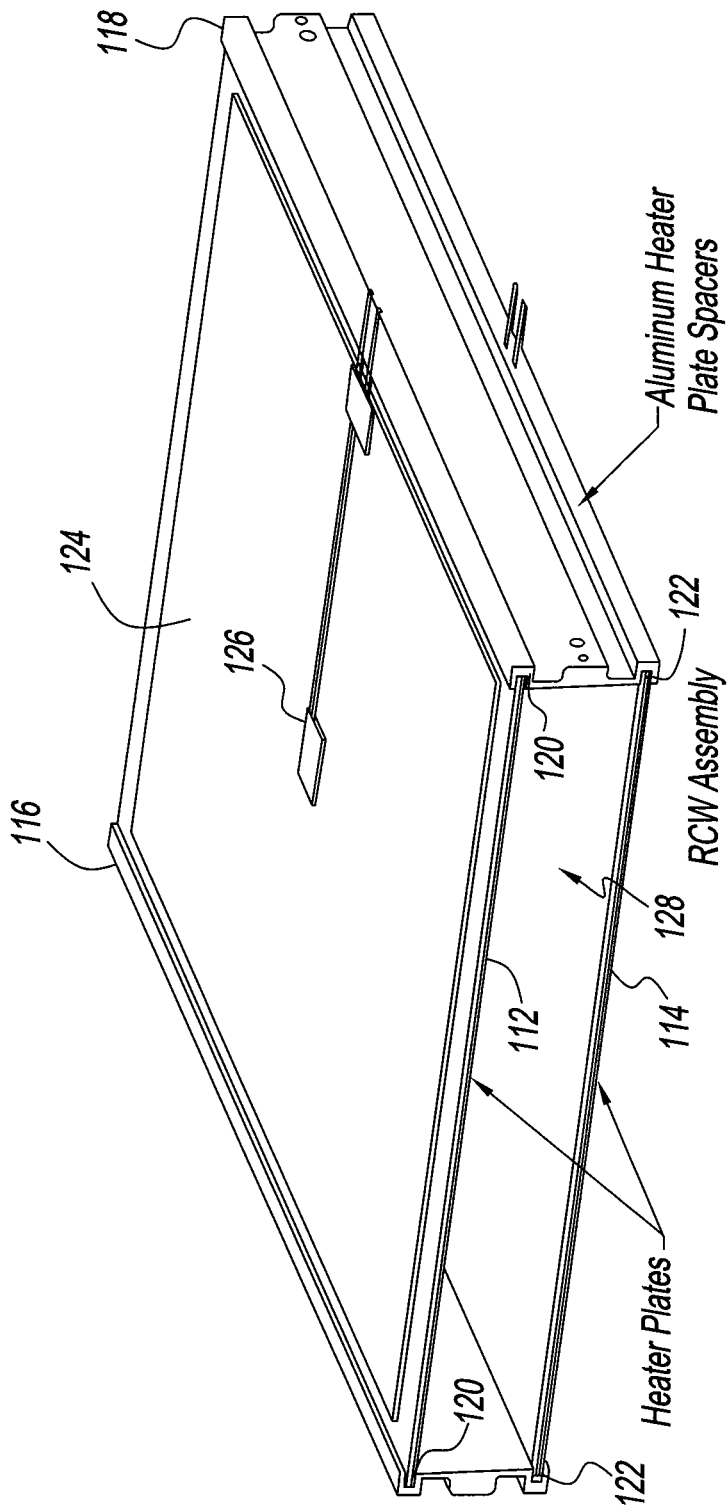
FIG. 6 is a perspective view of the row assembly of FIG. 5 with bezels removed.
Figure 9:
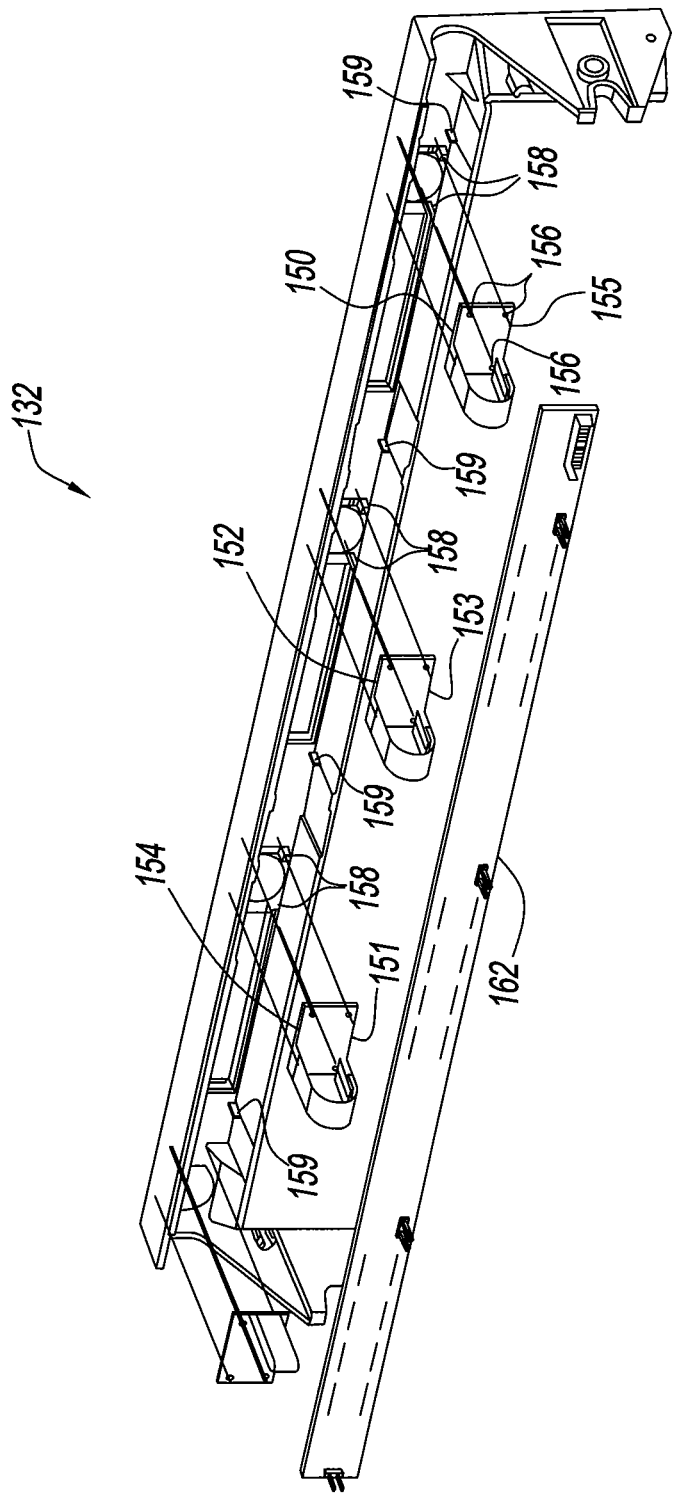
FIG. 9 is a back perspective view of the bezel of FIG. 8.
Figure 10:
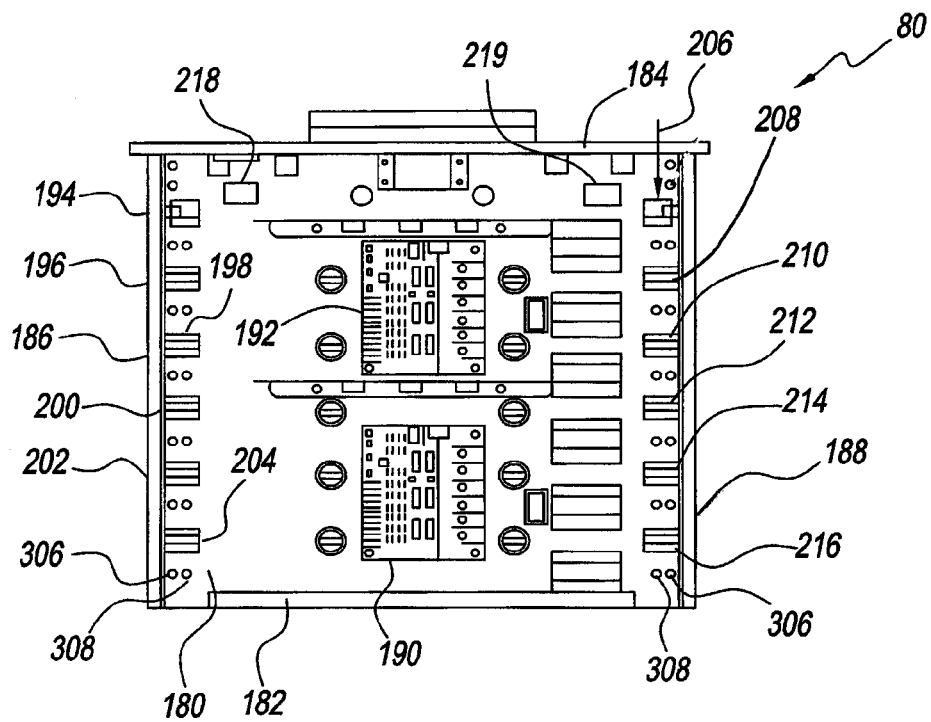
FIG. 10 is an elevation view of the left inner side panel of the food holding cabinet of FIG. 3.

Referring to FIGS. 3-7 and 11, a plurality of row assemblies 100, 102, 104, 106, 108 and 110 are supported by first inner side panel 80 and second inner side panel 82. Each row assembly, e.g., row assembly 102, comprises an upper heater assembly 111 and a lower heater assembly 113 (shown in FIG. 7). Upper heater assembly 111 and lower heater assembly 113 comprise an upper heater plate 112 and a lower heater plate 114, respectively. Upper heater plate 112 and lower heater plate 114 are supported by a pair of spacer side rails 116 and 118. Spacer side rails 116 and 118 are attached to upper heater plate 112 by any suitable fastener, for example set screws 302 (shown in FIG. 5) and to lower heater plate 114 by similar set screws (not shown). Spacer side rails 116 and 118 are also attached to first and second inner side panels 80 and 82 by screws 308 (×2 on each side) in top and bottom of spacer side rails 116 and 118 as shown in FIGS. 9 and 10. Spacer side rails 116 and 118 each include an upper slot 120 and a lower slot 122 that extend from front to back. Opposite side edges of upper heating plate 112 fit into upper slots 120 of spacer side rails 116 and 118 (shown in FIG. 6). Opposite side edges of lower heating plate 114 fit into lower slots 122 of spacer side rails 116 and 118 (shown in FIG. 6). As shown in FIG. 4, inner top panel 84 is spaced by a gap 96 from a panel 95, which is spaced by a gap 98 from upper heater assembly 111 in row 100.

Upper heater assembly 111 further comprises a heater 124, e.g., a vulcanized heater, although other types of heaters may be used. Heater 124 is disposed on the upper surface of heater plate 112 and carries a temperature sensor 126. Lower heater assembly 113 further comprises a similar vulcanized heater (not shown) that is disposed on the lower surface of lower heater plate 114 and that carries a temperature sensor (not shown). Upper and lower slots 120 and 122 are spaced to provide a gap or cavity 128 to permit the insertion of a food tray for holding. Upper and lower heater plates 112 and 114 may be any suitable material that transfers heat from the vulcanized heaters 124 to cavity 128. For example, upper and lower heater plates 112 and 114 may be formed of a metal, for example, aluminum, stainless steel, or other metals.

A thermal insulation layer 130 is wrapped around row assembly 102 and spacer side rails 116 and 118. Insulation layer 130 lowers any heat transfer from upper heater plate 112 of row assembly 102 to row assembly 100 and from lower heater plate 114 of row assembly 102 to row assembly 104. A similar insulation layer 130 of row assemblies 100 and 104 further limits heat transfer from adjacent row assemblies 100 and 104 to row assembly 102. Row assemblies 106, 108 and 110 are similarly wrapped with an insulation layer 130 to limit heat transfer to and from adjacent row assemblies.

Referring to FIGS. 3, 5, 7 and 8, a bezel 132 and a bezel 133 are provided for each row assembly. Bezel 132 for row assembly 102 covers a front edge of upper heater plate 112 of row assembly 102 and a front edge of lower heater plate 114 of row assembly 100 as shown in FIG. 7. Bezel 132 for row assembly 104 covers a front edge of upper heater plate 112 of row assembly 104 and a front edge of lower heater plate 114 of row assembly 102 and so on for row assemblies 106, 108 and 110. Bezel 132 for row assembly 100 covers only a front edge of the upper heater assembly 112 of row assembly 100 as row assembly 100 is the topmost row assembly. Bezel 133 covers a back edge of upper heater plate 112 of row assembly 102 and, though not shown in the drawing, covers a front edge of lower heater plate 114 of row assembly 100. Bezel 133 is otherwise identical to bezel 132. A bezel 133 is similarly provided for each of the other row assemblies. Bezels 132 and 133 are attached to inner side panels 80 and 82 and to the row assemblies by a suitable fastener, for example, screws 306 shown in FIGS. 10 and 11.

Referring to FIGS. 7 and 8, bezel 132 comprises an elongated C-shaped body that has a display face 134 (shown in FIG. 8) and a pair of legs 136 and 138. Legs 136 and 138 have one or more portions or hooks 140 at their respective terminal ends. Legs 136 and 138 and hooks 140 are dimensioned so that hooks 140 fit snugly into mating portions or slots 142 of lower heater plate 114 of row assembly 100 and upper heater plate 112 of row assembly 102 with a snap-in action. This provides an interlock that minimizes unsealed interfaces or provides a seal to heater plates 112 and 114, thereby mitigating oil and/or grease migration.

Figure 5:
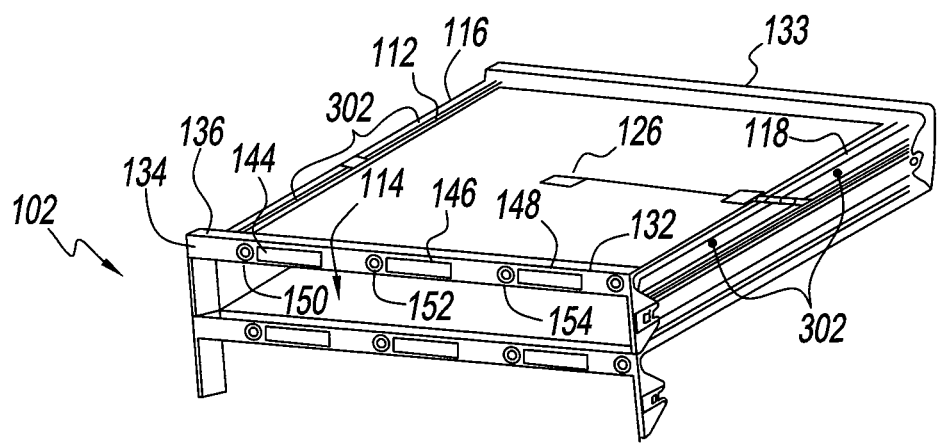
FIG. 5 is a perspective view of a row assembly of the food holding cabinet of FIG. 3.

Referring to FIGS. 5 and 8, display face 134 comprises displays 144, 146 and 148 and buttons 150, 152 and 154. Displays 144, 146 and 148 display information concerning food items placed in corresponding locations on lower heating plate 114 of a corresponding row assembly. Buttons 150, 152 and 154 are manually operable to activate and deactivate the timers that control food hold time. Buttons 150, 152 and 154 also play a role in manual programming.

Bezel 132 also comprises side legs 164. Each side leg 164 includes an open portion 166 and a notch 168. Notch 168 provides a loose fit that allows bolt 306 to stay in place to hold the row assembly up while bezel 132 is removed. Bezel 132 also provides a duct 160 for cooling air to flow and cool a component, for example, components disposed on a display control board 162 (shown in FIGS. 7 and 9) for displays 144, 146 and 148.

Bezels 132 and 133 are formed of a suitable material, for example, plastic or metal. Preferably, bezels 132 and 133 are composed of a plastic part and a molded in graphic overlay, which has a thermal conductivity lower than metal, although metallic bezels may be used in some embodiments. Buttons 150, 152 and 154 are attached to bezel 132 or 133 by any suitable fasteners, but are preferably heat staked in plastic bezels 132 and 133.

Referring to FIG. 9, buttons 150, 152 and 154 of bezel 132 are shown heat staked to separate boards 155, 153, and 151, respectively, which each contain four apertures 156 that are located near the corners of each board (the apertures in the upper left hand corners being obscured in FIG. 9). Bezel 132 includes for each board 151, 153 and 155 four plastic posts 158 located to be in registry with and to mate with apertures 156 when assembled. The upper posts for each board 151, 153 and 155 are obscured in FIG. 9. Heat staking is accomplished with a heating iron adjacent posts 158 while resident in their respective apertures 156 to form heat staked joints. This arrangement gives strong support to buttons 150, 152 and 154 and distributes force, which is applied manually by an operator to any of buttons 150, 152 and 154, along bezel 132. This is distinguished from known cabinets in which the buttons were mounted to one or more circuit boards for the row displays. These circuit boards were made thick and required strong metallic support to handle the force distribution. The arrangement of FIG. 9 allows display control board 162 to be about 50% smaller than display control boards of the known food holding cabinet of FIG. 1. Heat staked buttons 150, 152 and 154 also help to seal the row assemblies for oil migration should the overlay fail around a button. Bezels 132 and 133 in an alternate embodiment may have an adhesive backed overlay instead of a molded in overlay. Display board 162 carries displays 144, 146 and 148 and fastens to bezel 132 by a snap action to molded tabs 159 disposed on bezel 132.

Figure 11:
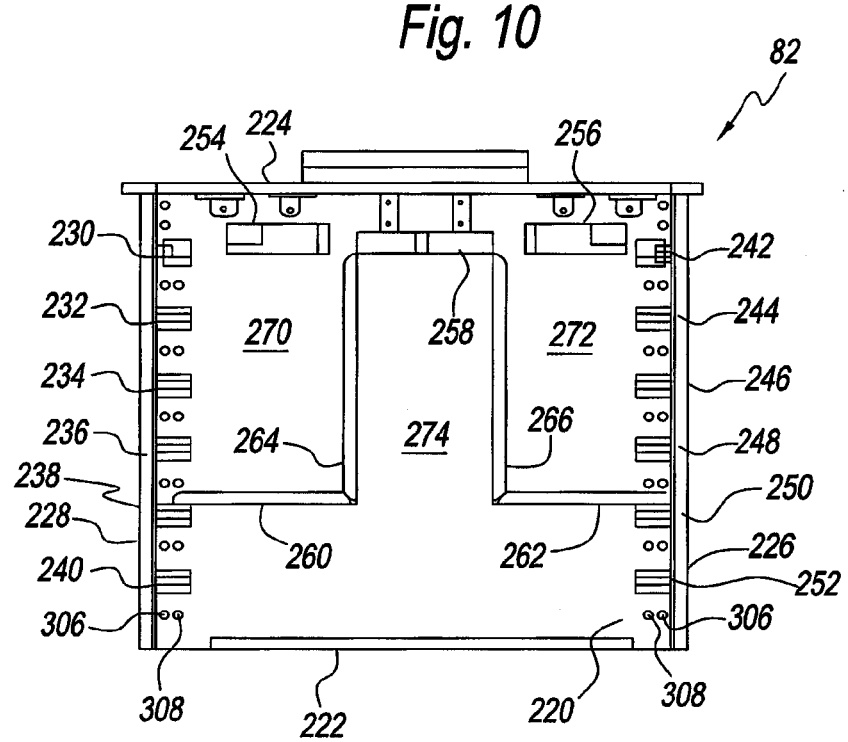
FIG. 11 is an elevation view of the right inner side panel of the food holding cabinet of FIG. 3.
Figure 12:
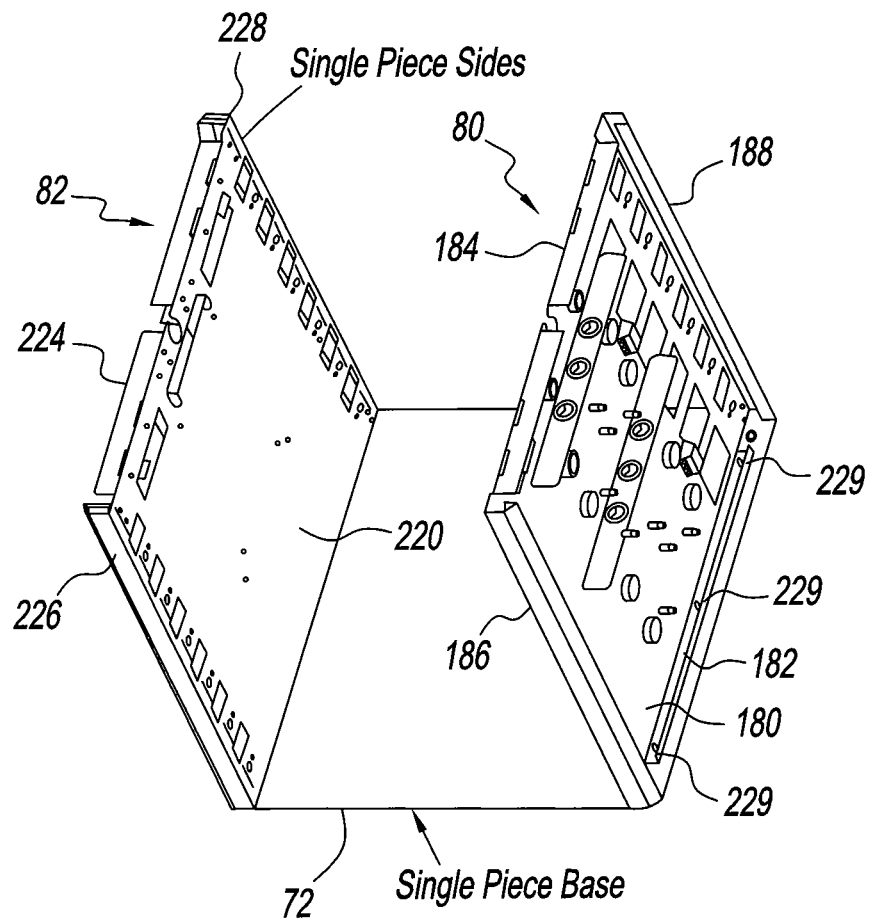
FIG. 12 is a perspective view of the base and inner side panels of the food holding cabinet of FIG. 3.

Referring to FIGS. 10-12, first inner side panel 80 and second inner side panel 82 and base 72 comprise a three-piece assembly vis-à-vis a larger number of pieces for the known food holding cabinet of FIG. 1. First inner side panel 80 comprises a vertical sheet 180 that has flanges 182 and 184 at opposite horizontal edges and flanges 186 and 188 at opposite vertical edges. Second inner side panel 82 comprises a vertical sheet 220 that has flanges 222 and 224 at opposite horizontal edges and flanges 226 and 228 at opposite vertical edges. To assemble the three pieces, first and second inner side panels 80 and 82 are fastened to base 72 with screws or bolts. For example, screws 229 fasten flange 182 of first inner side panel 80 to base 72. Similar screws (not shown) fasten flange 222 of second inner side panel 82 to base 72. Vertical sheets 180 and 220 are preferably formed of plastic or metal, e.g., stainless steel. Strength improvement and some cost savings are achieved by making inner side panels 80 and 82 integral with corner flanges 186, 188, 226 and 228.

Referring to FIG. 10, a component board 190 and a component board 192 are disposed on vertical sheet 180. Each component board, for example, comprises components that control the power supplied to the heater plates of row assemblies 100, 102, 104, 106, 108 and 110. Vertical sheet 180 comprises a plurality of ports 194, 196, 198, 200, 202 and 204 that are disposed adjacent flange 186 and that are positioned to interface with a first end of ducts 160 of bezels 132 of row assemblies 100, 102, 104, 106, 108 and 110, respectively. Vertical sheet 180 comprises a plurality of ports 206, 208, 210, 212, 214 and 216 that are disposed adjacent flange 188 and that are positioned to interface with one end of ducts 160 of bezels 132 of row assemblies 100, 102, 104, 106, 108 and 110, respectively. Vertical sheet 180 also comprises a port 218 and a port 219 adjacent horizontal flange 184.

Referring to FIG. 11, vertical sheet 220 comprises a plurality of ports 230, 232, 234, 236, 238 and 240 that are disposed adjacent flange 228 and that are positioned to interface with second end of ducts 160 of bezels 133 of row assemblies 100, 102, 104, 106, 108 and 110, respectively. Vertical sheet 220 comprises a plurality of ports 242, 244, 246, 248, 250 and 252 that are disposed adjacent flange 226 and that are positioned to interface with a second end of ducts 160 of bezels 132 of row assemblies 100, 102, 104, 106, 108 and 110, respectively. Vertical sheet 220 also comprises a port 254, a port 256 and a port 258. Vertical sheet 220 further comprises baffles 260, 262, 264 and 266 that are disposed to provide a plurality of paths 270, 272 and 274. Path 270 guides airflow from ports 230, 232, 234 and 236 to port 254. Path 272 guides airflow from ports 242, 244, 246 and 248 to port 256. Path 274 guides airflow from ports 238, 240, 250 and 252 to port 258.

Figure 13:
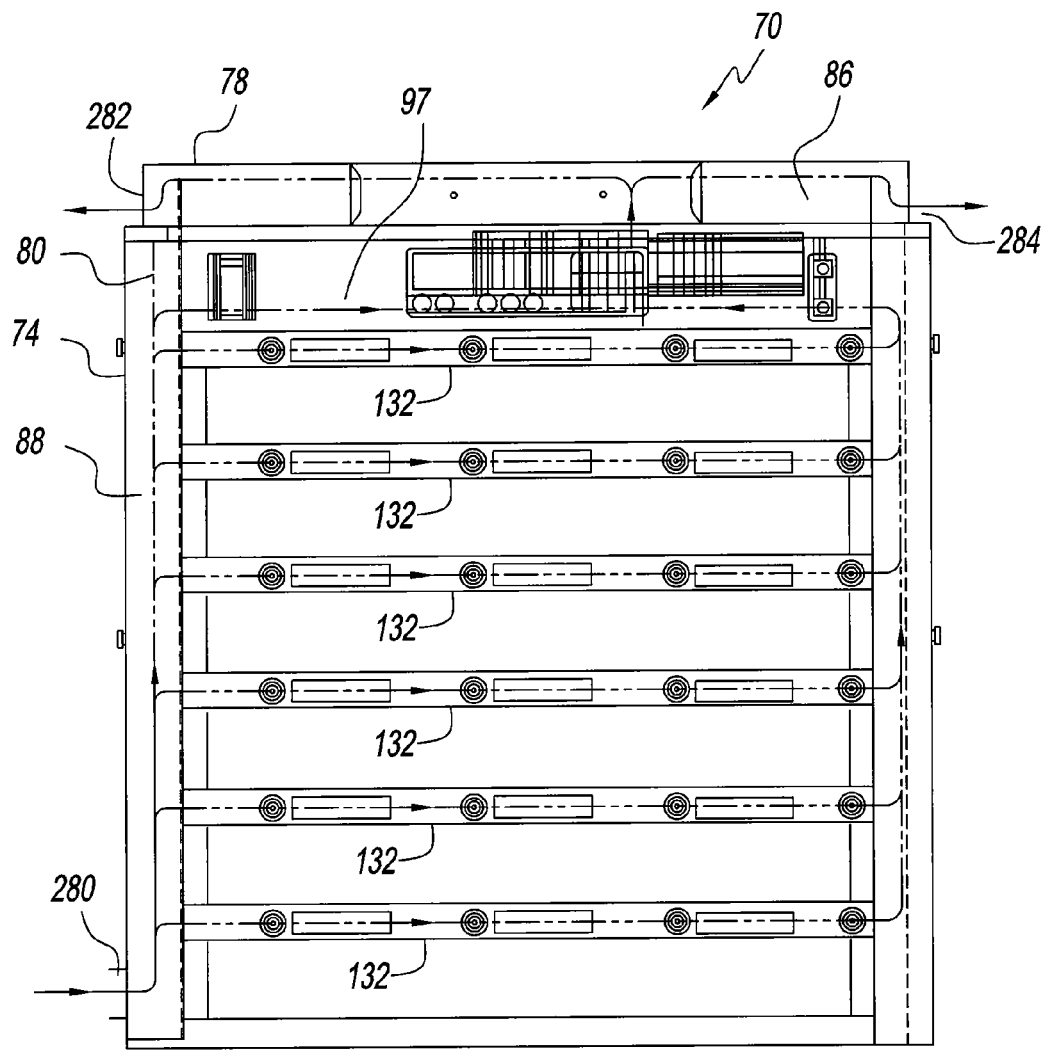
FIG. 13 is a front view of the food holding cabinet of FIG. 3 depicting the cooling airflow through the food holding cabinet.

Referring to FIGS. 4 and 13, air enters food holding cabinet 70 through an intake port 280 near the lower edge of first outer panel 74 (shown in FIG. 13) and flows in the pattern depicted by arrows and exits food holding cabinet 70 through exit ports 282 and 284 located in outer top panel 78. The air flows in a gap 88 between first outer side panel 74 and first inner side panel 80 as depicted by the arrow. Gap 88 is closed by vertical flanges 186 and 188 and horizontal flange 184 (FIGS. 10 and 12). The airflow cools component boards 190 and 192 disposed on sheet 180 (FIG. 10). The airflow exits gap 88 through ports 194, 196, 198, 200, 202 and 204 to channels or ducts 160 of bezels 132 and through ports 206, 208, 210, 212, 214 and 216 to channels or ducts 160 of bezels 133. The airflow in ducts 160 cools display component board 162 associated with displays 144, 146 and 148.

The airflow exits ducts 160 through ports 230, 232, 234, 236, 238, 240, 242, 244, 246, 248, 250 and 252 of second inner side panel 82 (FIG. 11) and enters a gap 90 between second inner panel 82 and second outer panel 76 (FIG. 4). Gap 90 is closed by vertical flanges 226 and 228 and horizontal flange 224 (FIGS. 11 and 12). Referring also to FIG. 11, the airflow in gap 90 is divided into paths 270, 272 and 274 by baffles 262, 264 and 266. Thus, air entering via ports 230, 232, 234 and 236 flows in path 270 and exits through port 254. Air entering through ports 242, 244, 246 and 248 flows in path 272 and exits through port 256. Air entering through ports 238, 240, 250 and 252 flows in path 274 and exits through port 258.

Figure 14:
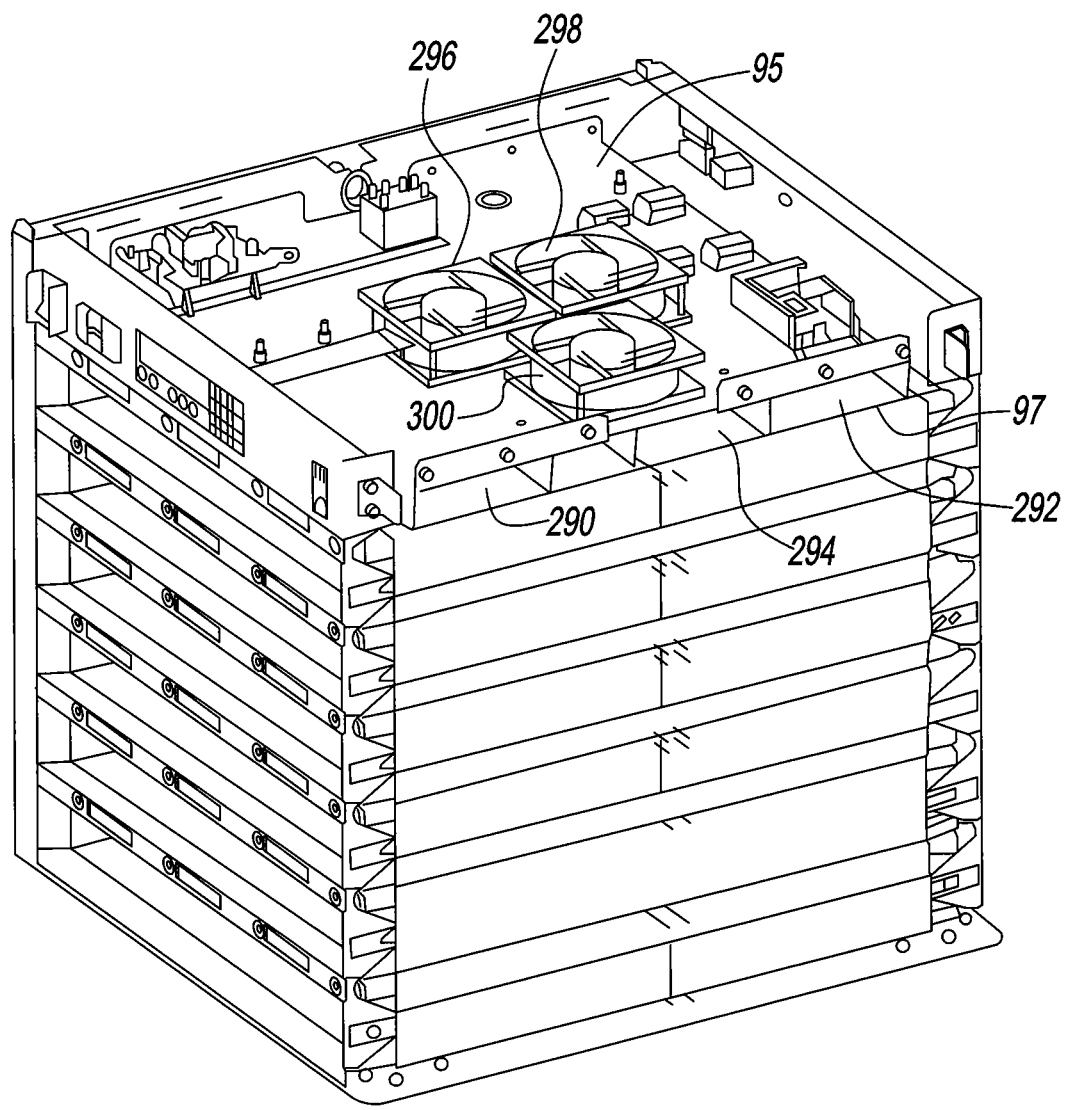
FIG. 14 is a perspective view of the food holding cabinet of FIG. 3 with the outer and inner side panels removed from the right side.

Referring to FIG. 14, airflow exiting gap 90 through ports 254, 256 and 258 enters a plenum 290, a plenum 292 and a plenum 294, respectively, which are disposed in gap 96 (FIG. 4). Airflow in plenums 290 and 292 provides cooling of components associated with user interface 92, timer display 64 and temperature display 66 and located behind front panel 94. The airflow in plenums 290 and 292 is drawn by fans or blowers 296 and 298, respectively and expelled into gap 86. The airflow in plenum 294 is drawn by a fan 300 and expelled into gap 86. The airflow exits through exit ports 282 and 284 of outer top panel 78. Airflow in gap 88 also exits via ports 218 and 219 (FIG. 10) to gap 96 and is drawn by fans 296 and 298.

The duct system of the present disclosure includes the ducts 160 (FIG. 7) of row assemblies 100, 102, 104, 106, 108 and 110, gaps 86, 88 and 98 (FIGS. 4 and 12), paths 270, 272 and 274 (FIG. 11), intake port 280, exit ports 282 and 284 (FIG. 13) and fans 296, 298 and 300 (FIG. 14). Baffles 264 and 266 are dimensioned to leave an opening or a gap 268 (shown in FIG. 4) between second outer side panel 76 and baffles 264 and 266. Should one or more of fans 296, 298 or 300 fail, the remaining fan or fans will draw air via gap 268 to maintain a cooling air flow in the row assemblies.

The present disclosure having been thus described with particular reference to the preferred forms thereof, it will be obvious that various changes and modifications may be made therein without departing from the spirit and scope of the present disclosure as defined in the appended claims.

What is claimed is:

1. A food holding cabinet for keeping pre-cooked food warm comprising:
    a support structure that supports a plurality of row assemblies, wherein each of said row assemblies comprises a first heater assembly spaced from a second heater assembly to form a food holding cavity; and
    an exterior side through which food may be inserted and removed from the food holding cavity, the side comprising a bezel that covers an edge of the first heater assembly of a first one of said row assemblies and an edge of the second heater assembly of a second one of said row assemblies.

2. The food holding cabinet of claim 1, wherein each of said row assemblies further comprises a layer of insulation that surrounds said first and second heater assemblies, thereby inhibiting heat transfer between said first and second heater assemblies of adjacent ones of said row assemblies.

3. The food holding cabinet of claim 1, wherein said bezel is a first bezel, and further comprising a second bezel that covers an edge of the first heater assembly of said second row assembly and the second heater assembly of a third one of said row assemblies.

4. The food holding cabinet of claim 1, wherein said bezel is formed with a material selected from the group consisting of: plastic, metal and a combination thereof.

5. The food holding cabinet of claim 4, wherein said bezel is formed of plastic, and further comprising one or more buttons that are heat staked in said bezel so that loading from manual operation of said buttons is distributed along said bezel.

6. The food holding cabinet of claim 1, wherein said bezel is connected by an interlock to the first heater assembly of said first row assembly and the second heater assembly of said second row assembly, and wherein said interlock forms a first seal that mitigates oil migration between the first row assembly and the bezel and a second seal that mitigates oil migration between the second row assembly and the bezel.

7. The food holding cabinet of claim 6, wherein each of said first heater assemblies comprises a heater disposed on a heater plate comprising the edge of the first heater assembly, wherein each of said second heater assemblies comprises a heater disposed on a heater plate comprising the edge of the second heater assembly, and wherein said bezel is fastened by said interlock to the edge of the first heater plate of the first heater assembly of the first row assembly and to the edge of the second heater plate of the second heater assembly of the second row assembly.

8. The food holding cabinet of claim 7, wherein said interlock comprises first and second portions of said bezel that mate with a corresponding first portion of the first heater plate of the first heater assembly of said first row assembly and to a corresponding first portion of the second heater plate of the second heater assembly of said second row assembly, respectively.

9. The food holding cabinet of claim 1, wherein said support structure comprises first and second unitary side panels that support said row assemblies.

10. The food holding cabinet of claim 9, wherein said first unitary side panel carries a duct structure that guides cooling air to a plurality of fans.

11. The food holding cabinet of claim 10, wherein said duct structure comprises one or more baffles that provide separate paths for airflow from opposite edges of one of said row assemblies drawn by said plurality of fans.

12. The food holding cabinet of claim 3 wherein the cavity of the second row assembly has an opening for inserting and removing food from the cavity of the second row assembly, the opening located between the first and second bezels.

13. The food holding cabinet of claim 1 wherein the bezel comprises a display and a display component board, the bezel forming a first duct between the bezel, the first heater assembly of the first row assembly and the second heater assembly of the second row assembly, the duct for cooling the display component board.

14. The food holding cabinet of claim 13, wherein said bezel is a first bezel, and further comprising a second bezel that covers an edge of the first heater assembly of said second row assembly and an edge of the second heater assembly of a third one of said row assemblies, the second bezel forming a second duct between the second bezel, the first heater assembly of the second row assembly and the second heater assembly of the third row assembly, the second duct for cooling at least one component of the second bezel.

15. The food holding cabinet of claim 14 further comprising first and second fans and a duct system, the duct system structured to direct air through the first duct to the first fan and to direct air through the second duct to the second fan.

16. The food holding cabinet of claim 15, wherein said duct system is structured for said second fan to draw air from said first duct in the event of failure of said first fan.

17. The food holding cabinet of claim 15, further comprising a third fan, a third bezel, wherein the edge of the first heater assembly of the first row assembly is a first edge, the first heater assembly of the first row assembly comprises a second edge opposite the first edge of the first heater assembly of the first row assembly, the edge of the second heater assembly of the second row assembly is a first edge, the second heater assembly of the second row assembly comprising a second edge opposite the first edge of the second heater assembly of the second row assembly, the third bezel forming a third duct between the third bezel, the first heater assembly of the first row assembly and the second heater assembly of the second row assembly, the duct system structured to direct air through the third duct to the third fan.

18. The food holding cabinet of claim 10 further comprising a duct system comprising the duct structure, one or more air intake ports for intaking the cooling air into the duct system, and one or more exit ports separate from the intake ports for exhausting the cooling air to the environment.

19. A method of assembling a food holding cabinet comprising:
    assembling a plurality of row assemblies, wherein each of said row assemblies comprises a first heater assembly spaced from a second heater assembly to form a food holding cavity;
    fastening first and second unitary side panels to opposite edge portions of a base;
    fastening said plurality of row assemblies to said first and second unitary side panels; and
    fastening a plurality of bezels to said row assemblies, wherein at least one of said bezels covers an edge of the first heater assembly of a first one of said row assemblies and an edge of the second heater assembly of a second one of said row assemblies, wherein the food holding cabinet comprises an exterior side through which food may be inserted and removed from the food holding cavity, the side comprising the plurality of bezels.

20. The method of claim 19, wherein each of said bezels is attached to said edges with an interlock, and wherein said interlock forms a first seal that mitigates oil migration between the first row assembly and the bezel and a second seal that mitigates oil migration between the second row assembly and the bezel.

21. The method of claim 20, wherein each of said bezels is attached to said edges with the interlock by a snap in action.

22. The method of claim 19, further comprising:
    disposing on said first unitary side panel a duct structure that guides cooling air to a plurality of fans.

23. The method of claim 22, wherein said duct structure comprises one or more baffles that provide separate paths for airflow from opposite edges of one of said row assemblies drawn by said plurality of fans.

24. A method of cooling components of a food holding cabinet comprising:
    cooling a plurality of displays and a plurality of component boards by drawing cooling air with a plurality of fans between a plurality of row assemblies of said food holding cabinet, wherein each of said row assemblies comprises a first heater assembly spaced from a second heater assembly to form a food holding cavity for keeping said pre-cooked food warm, a display that is exposed to said cooling air and at least one component board that is exposed to said cooling air; and
    guiding said cooling air between said row assemblies and said fans via a plurality of separate paths.

25. The method of claim 24, further comprising providing one or more baffles to form said separate paths.

26. The method of claim 25, wherein a first fan and a second fan of said plurality of fans draw said cooling air from at least a first one and a second one of said row assemblies via first and second ones of said separate paths, respectively, and wherein one of said baffles has an opening through which said first fan draws air from said second row assembly should said second fan fail.

\* \* \* \* \*